US010030334B2

(12) United States Patent
Coppens et al.

(10) Patent No.: US 10,030,334 B2
(45) Date of Patent: Jul. 24, 2018

(54) FLUOROCHEMICAL COMPOUNDS, COMPOSITIONS, ARTICLES, AND METHODS

(71) Applicant: 3M INNOVATIVE PROPERTIES COMPANY, St. Paul, MN (US)

(72) Inventors: Dirk M. Coppens, Beveren (BE); Rudolph J. Dams, Antwerp (BE); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 740 days.

(21) Appl. No.: 14/388,165

(22) PCT Filed: Mar. 6, 2013

(86) PCT No.: PCT/US2013/029263
§ 371 (c)(1),
(2) Date: Sep. 25, 2014

(87) PCT Pub. No.: WO2013/162704
PCT Pub. Date: Oct. 31, 2013

(65) Prior Publication Data
US 2015/0038037 A1 Feb. 5, 2015

Related U.S. Application Data

(60) Provisional application No. 61/656,735, filed on Jun. 7, 2012, provisional application No. 61/637,668, filed on Apr. 24, 2012.

(51) Int. Cl.
| *D06M 15/576* | (2006.01) |
| *D06M 15/277* | (2006.01) |
| *C09D 133/16* | (2006.01) |
| *C08G 18/38* | (2006.01) |
| *C08G 18/50* | (2006.01) |
| *C08G 18/28* | (2006.01) |
| *C08G 18/62* | (2006.01) |
| *C08G 18/76* | (2006.01) |
| *D06M 101/32* | (2006.01) |
| *D06M 101/34* | (2006.01) |

(52) U.S. Cl.
CPC ....... *D06M 15/576* (2013.01); *C08G 18/2825* (2013.01); *C08G 18/3812* (2013.01); *C08G 18/3876* (2013.01); *C08G 18/5015* (2013.01); *C08G 18/6279* (2013.01); *C08G 18/7664* (2013.01); *C09D 133/16* (2013.01); *D06M 15/277* (2013.01); *D06M 2101/32* (2013.01); *D06M 2101/34* (2013.01); *D06M 2200/01* (2013.01); *D06M 2200/10* (2013.01); *D06M 2200/11* (2013.01); *D06M 2200/12* (2013.01); *Y10T 442/2861* (2015.04)

(58) Field of Classification Search
CPC ............ C08G 18/5015; C08G 18/3812; C08G 18/3876; C08G 18/6279; C08G 18/2825; C08G 18/7664; C09D 133/16; Y10T 442/2861; D06M 15/576; D06M 15/277; D06M 2200/11; D06M 2200/10; D06M 2101/32; D06M 2101/34
See application file for complete search history.

(56) References Cited

U.S. PATENT DOCUMENTS

| 5,276,175 | A | 1/1994 | Dams |
| 5,453,540 | A | 9/1995 | Dams |
| 5,910,557 | A | 6/1999 | Audenaert |
| 6,043,203 | A * | 3/2000 | Urfer ....................... A61K 8/45 |
| | | | 510/119 |
| 6,162,369 | A | 12/2000 | Allewaert |
| 6,224,782 | B1 | 5/2001 | Allewaert |
| 6,239,247 | B1 | 5/2001 | Allewaert |
| 6,664,354 | B2 | 12/2003 | Savu |
| 7,078,456 | B2 | 7/2006 | Jariwala |
| 7,750,093 | B2 | 7/2010 | Elsbernd |
| 7,807,614 | B2 | 10/2010 | Bigorra Llosas |
| 2004/0087475 | A1 * | 5/2004 | Jonke ..................... C11D 1/835 |
| | | | 510/515 |
| 2006/0029799 | A1 * | 2/2006 | Sebastian .................. B32B 3/26 |
| | | | 428/355 R |
| 2007/0004895 | A1 | 1/2007 | Elsbernd |
| 2007/0244289 | A1 | 10/2007 | Audenaert |

FOREIGN PATENT DOCUMENTS

| EP | 1 149 897 | 7/2000 |
| WO | WO 2013-162705 | 10/2013 |

OTHER PUBLICATIONS

International Search Report for PCT International Application No. PCT/US2013/029263, dated Jul. 16, 2013, 3 pages.

* cited by examiner

*Primary Examiner* — Rabon Sergent

(57) ABSTRACT

A fluorinated compound comprising: (i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein: the polymerized (meth)acrylate units are present in a molar ratio of at least 6:1 relative to the functionalized chain transfer agent; and the (meth)acrylate units comprise 0-30 mole-% acrylate units and 70-100 mole-% methacrylate units; (ii) a fluorine-free hydrocarbon moiety; (iii) a di-, tri-, or polymeric isocyanate-derived linking group; and (iv) a group that imparts a durable property when the compound is applied to a fibrous substrate.

26 Claims, No Drawings

FLUOROCHEMICAL COMPOUNDS, COMPOSITIONS, ARTICLES, AND METHODS

BACKGROUND

Repellent fluorochemical treatment compositions based on C4-fluorochemistry have been in use over the past few years. Many commercially available products require complex chemistry, resulting in processing and production issues and high manufacturing costs. There is a need for additional fluorochemical repellent treatment compositions with high durability and dynamic water repellency, good "hand feeling" and runnability, that can be made with manufacturing processes that are easier to implement and scale-up than the processes used to manufacture commercially available products.

SUMMARY

The present disclosure provides fluorinated compounds, and fluorochemical compositions that can include one or more such fluorinated compounds. Such fluorinated compounds can be used with one or more surfactants in fluorochemical treatment compositions. Such fluorochemical treatment compositions can be used to treat fibrous substrates, especially synthetic textiles such as polyester and nylon, to impart one or more repellency characteristics (e.g., water repellency) to such substrate.

In one embodiment, the present disclosure provides a fluorinated compound comprising:
(i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
the polymerized (meth)acrylate units are present in a molar ratio of at least 6:1 relative to the functionalized chain transfer agent; and
the (meth)acrylate units comprise 0-30 mole-% acrylate units and 70-100 mole-% methacrylate units;
(ii) a fluorine-free hydrocarbon moiety;
(iii) a di-, tri-, or polymeric isocyanate-derived linking group; and
(iv) a group that imparts a durable property when the compound is applied to a fibrous substrate.

In one embodiment, the present disclosure provides a fluorochemical composition comprising at least one fluorinated compound comprising: (i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein: the polymerized (meth)acrylate units are present in a molar ratio of at least 6:1 relative to the functionalized chain transfer agent; and the (meth)acrylate units comprise 0-30 mole-% acrylate units and 70-100 mole-% methacrylate units; (ii) a fluorine-free hydrocarbon moiety; (iii) a di-, tri-, or polymeric isocyanate-derived linking group, and (iv) a group that imparts a durable property when the compound is applied to a fibrous substrate. Herein, a fluorochemical composition can include one fluorinated compound as described herein, or a mixture of different fluorinated compounds as described herein.

In one embodiment, the present disclosure provides a fluorinated compound prepared by reacting:
(i) a functional fluorochemical oligomer having the formula (Formula I):
H—[($R^f$-Q)C($R^1$)—$CH_2$]$_m$—S—$R^2$-($T^1$)$_p$, wherein: each $R^f$ is independently a perfluorinated terminal C4-C6 aliphatic group; each Q is independently an organic linking group; each $R^1$ is independently H or methyl; m is at least 6; $R^2$ is a divalent or trivalent organic linking group; $T^1$ is —OH or —$NH_2$; and p is 1 or 2; (ii) a fluorine-free mono-, di-, or poly-alcohol;
(iii) a di-, tri-, or poly-isocyanate; and (iv) a blocking agent.

In one embodiment, the present disclosure provides a fluorochemical treatment composition comprising at least one fluorinated compound as described herein, water, and one or more surfactants. Any combination of fluorinated compounds and surfactants described herein can be used in such treatment compositions.

In one embodiment, the present disclosure provides a method of imparting repellency to a fibrous substrate having one or more surfaces, the method comprising: applying a fluorochemical treatment composition as described herein onto one or more surfaces of the fibrous substrate; and curing the fluorochemical composition.

In one embodiment, the present disclosure provides an article comprising a fibrous substrate having one or more surfaces and a fluorochemical treatment composition as described herein coated on one or more surfaces of the fibrous substrate.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one Q group is present in a formula, each Q group is independently selected. Furthermore, subgroups contained within these groups are also independently selected. For example, when each Q group contains an $R^3$, each $R^3$ is also independently selected.

As used herein, the term "room temperature" refers to a temperature of about 20° C. to about 25° C. or about 22° C. to about 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

The present disclosure provides fluorinated compounds and fluorochemical compositions that can include one or more fluorinated compounds. Such fluorinated compounds can be used with one or more surfactants in fluorochemical treatment compositions to treat fibrous substrates, to impart one or more repellency characteristics (e.g., water repellency) to a fibrous substrate.

Certain preferred fluorochemical treatment compositions of the present disclosure impart good water repellency to a fibrous substrate, particularly polyester and polyamide fabrics, as demonstrated by a 100 spray rating of a treated substrate (treated and tested according to the Spray Rating procedure in the Examples Section). Certain preferred fluorochemical treatment compositions of the present disclosure demonstrate such Spray Rating and also impart good dynamic water repellency to a fibrous substrate, particularly polyester and polyamide fabrics, as demonstrated by no greater than 50 milliliter (ml) water penetration and no greater than 40% water absorption of a treated substrate (treated and tested according to the Water Penetration procedure in the Examples Section). Certain preferred fluorochemical treatment compositions of the present disclosure demonstrate these characteristics and are also durable after washing such that, after 5 launderings (as described in the Examples Section), a treated substrate demonstrates a Spray Rating of at least 70 (tested according to the Spray Rating procedure in the Examples Section).

Such advantageous repellency characteristics result because of the unique properties of a fluorinated compound of the present disclosure. Such fluorinated compounds include: (i) a fluorochemical oligomeric portion; (ii) a fluorine-free hydrocarbon moiety; (iii) a di-, tri-, or polymeric isocyanate-derived linking group; and (iv) a group that imparts a durable property when the compound is applied to a fibrous substrate.

The fluorochemical oligomeric portion includes an aliphatic backbone including polymerized (meth)acrylate monomeric units, each having a perfluorinated terminal C4-C6 aliphatic group, and an organic residue obtained by removing a hydrogen atom from a functionalized chain transfer agent. The polymerized (meth)acrylate units are preferably present in a molar ratio of at least 6:1 (more preferably, at least 8:1) relative to the functionalized chain transfer agent. The polymerized (meth)acrylate units are preferably present in a molar ratio of no more than 20:1 relative to the functionalized chain transfer agent. The (meth)acrylate units typically include 0-30 mole-% acrylate units and 70-100 mole-% methacrylate units. Such acrylate and methacrylate units, if both are present, may be co-oligomerized or blended.

The fluorochemical oligomeric portion of the fluorinated compounds of the present disclosure is preferably derived from a functional fluorochemical oligomer having the formula (Formula I):

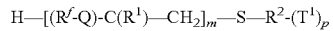

wherein:
each $R^f$ is independently a perfluorinated terminal C4-C6 aliphatic group;
each Q is independently an organic linking group;
each $R^1$ is independently H or methyl, with the proviso that 0-30 mole-% of the $R^1$ groups are H and 70-100 mole-% of the $R^1$ groups are methyl;
m is at least 6;
$R^2$ is a divalent or trivalent organic linking group;
$T^1$ is —OH or —NH$_2$; and
p is 1 or 2.

The linking group Q links the $R^f$ group into the functional fluorochemical oligomer of Formula I. Q preferably contains from 1 to 20 carbon atoms. Q can optionally contain oxygen, nitrogen, or sulfur-containing groups or a combination thereof. Q is preferably free of functional groups that substantially interfere with free-radical oligomerization (e.g., polymerizable olefinic double bonds, thiols, and other such functionality known to those skilled in the art). Examples of suitable Q groups include straight chain, branched chain, or cyclic alkylene, arylene, aralkylene, oxyalkylene, thioalkylene, sulfonyl, sulfoxy, sulfonamido, carboxyamido, carbonyloxy, urethanylene, ureylene groups, and combinations thereof, such as sulfonamidoalkylene.

A preferred linking group Q is selected from the group consisting of alkylene groups, polyoxyalkylene groups having 1 to 4 oxyalkylene moieties, and organic divalent linking groups according to the following formula (Formula II):

wherein: $R^3$ represents a linear or branched alkylene group having 2 to 20 carbon atoms; and $R^4$ represents an alkyl group having 1 to 4 carbon atoms or an aryl group having 6 to 10 carbon atoms.

The group $R^2$ of Formula I is a divalent or trivalent organic linking group. Preferably, $R^2$ is selected from the group consisting of linear or branched alkylenes (preferably having 2 to 6 carbon atoms), cyclic alkylenes, arylenes, and aralkylenes.

Functional fluorochemical oligomers of Formula I can be prepared from the polymerization of (meth)acrylate monomers, each having a perfluorinated terminal C4-C6 aliphatic group, in the presence of a functionalized chain transfer agent. Examples of (meth)acrylate monomers, each having a perfluorinated terminal C4-C6 aliphatic group, include:

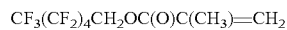

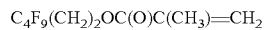

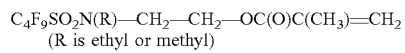

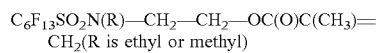

and acrylate analogues of these methacrylates.

Functionalized chain transfer agents useful in the preparation of the fluorochemical oligomer of Formula I preferably correspond to the following formula: HS—R$^2$-(T$^1$)$_p$ wherein: R$^2$ is as defined above, T$^1$ is an —OH or —NH$_2$ moiety, and p is 1 or 2 (preferably 1). Examples of chain transfer agents include those selected from 2-mercaptoethanol, 3-mercapto-2-butanol, 3-mercapto-2-propanol, 3-mercapto-1-propanol, 3-mercapto-I,2-propanediol, 11-mercaptoundecanol, 4-mercaptobutanol, 2-mercaptoethylamine, mercaptoacetic acid, 2-mercaptobenzimidazole, 2-mercaptobenzoic acid, 2-mercaptobenzothiazole, 2-mercaptobenzoxazole, 2-mercaptosulfonic acid, 2-mercaptonicotinic acid, 4-hydroxythiopheno-3-mercapto-1,2-propanediol, 1-mercapto-2-propanol, 2-mercaptopropionic acid, N-(2-mercaptopropionyl)glycine, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cystine, cystine hydrochloride, 3-mercaptopropionic acid, 12-mercaptododecanoicacid, 2-mercaptoethylamine, 1-chloro-6-mercapto-4-oxahexan-2-ol, 2,3-dimercaptosuccinic acid, 2,3-dimercaptopropanol, 2-chloroethanethiol, 2-amino-3-mercaptopropionic acid, and compounds such as the adduct of 2-mercaptoethylamine and caprolactam. A single compound or a mixture of different chain transfer agents may be used if desired. A preferred chain transfer agent is 2-mercaptoethanol.

Preferably, the ratio of the (meth)acrylate monomers, having a perfluorinated terminal C4-C6 aliphatic group, to functionalized chain transfer agent is at least 6:1, more preferably, at least 8:1, on a molar basis. Preferably, the ratio of the (meth)acrylate monomers (having a perfluorinated terminal C4-C6 aliphatic group) to functionalized chain transfer agent is no greater than 20:1, on a molar basis.

The (meth)acrylate monomers, having a perfluorinated terminal C4-C6 aliphatic group, can include only methacrylate monomers such that the fluorinated compound comprises a homo-oligomeric portion of methacrylate units. Alternatively, acrylate monomers and methacrylate monomers can co-polymerize such that the fluorochemical oligomeric portion of fluorinated compounds of the present disclosure includes co-oligomeric acrylate units (having a perfluorinated terminal C4-C6 aliphatic group) and methacrylate units (having a perfluorinated terminal C4-C6 aliphatic group). The acrylate units are present in an amount of no more than 30 mole-% acrylate units (70-100 mole-% methacrylate units).

Fluorochemical compositions of the present disclosure can include a mixture of fluorinated compounds as described herein. In such mixtures, no more than 30 mole-% of the mixture of fluorinated compounds includes acrylate units, having a perfluorinated terminal C4-C6 aliphatic group. In certain embodiments of such mixtures of fluorinated compounds, at least one fluorinated compound comprises a homo-oligomeric portion of acrylate units, having a perfluorinated terminal C4-C6 aliphatic group, and at least one fluorinated compound comprises a homo-oligomeric portion of methacrylate units, having a perfluorinated terminal C4-C6 aliphatic group, wherein the amount of acrylate homo-oligomer is no more than 30 mole-% of the total amount of (meth)acrylate units, having a perfluorinated terminal C4-C6 aliphatic group, in the mixture of fluorinated compounds.

If desired, a small mole percentage of fluorine-free (meth)acrylates can be included within the fluorochemical oligomeric portion. That is, optionally, functional fluorochemical oligomers of Formula I can be prepared from no more than 20 mole-%, and often no more than 10 mole-% of fluorine-free (meth)acrylate monomers in addition to the (meth) acrylate monomers having a perfluorinated terminal C4-C6 aliphatic group.

Again, fluorinated compounds of the present disclosure include: (i) a fluorochemical oligomeric portion as described above (prepared from a functional fluorochemical oligomer of Formula I); (ii) a fluorine-free hydrocarbon moiety; (iii) a di-, tri-, or polymeric isocyanate-derived linking group; and (iv) a group that imparts durability when the compound is applied to a fibrous substrate.

The fluorine-free hydrocarbon moiety of the fluorinated compounds described herein is preferably derived from a mono-, di-, or poly-functional fluorine-free hydrocarbon compound reactive with an isocyanate. For example, in certain embodiments, the fluorine-free hydrocarbon moiety can be derived from a fluorine-free mono-, di-, or poly-alcohol.

Examples of reagents suitable for use as a functional fluorine-free hydrocarbon compound include mono-, di-, or poly-functional siloxanes such as Dow Corning Q4-3667 (diol), Dow Corning X-2-8024 (dimercaptan), Dow Corning 1248 (polyol), Dow Corning Q4-3557 (polyol), Dow Corning 8026 (polyol), Dow Corning 531 and 536 (polyamines); poly(epichlorohydrin)mono-, di-, or triols (such as those available under the tradename PECH from 3M Co.); glyoxal; aminoalcohols such as triethanolamine, N,N-dimethylaminoethanol, methyldiethanolamine, ethyldiethanolamine, and taurine; mono-, di-, or poly-alcohols such as methanol, ethanol, butanol, 2-ethylhexanol, stearyl alcohol, behenyl alcohol, ethylene glycol, glycerol, 1,2,4-butanetriol, pentaerythritol, 1,4-butanediol, 1,6-hexanediol, 1,10-decanediol; mono-, di-, or poly-amines such as butylamine, dibutylamine, dihexylamine, ethylenediamine, 1,6-hexanediamine, diethylenetriamine, trieethylenetetramine, tetraethylenepentaamine; telomers and functionalized oligomers such as oligomers of acrylates or methacrylates end-capped with a functional end-capping agent capable of reacting with an isocyanate.

In certain embodiments, the functional fluorine-free hydrocarbon compound is methanol, ethanol, butanol, 2-ethylhexanol, ethylene glycol, glycerol, 1,2,4-butanetriol, pentaerythritol, 1,4-butanediol, 1,6-hexanediol, or 1,10-decanediol. In certain embodiments, the functional fluorine-free hydrocarbon compound is a long chain alcohol, preferably having 12 to 50 carbon atoms, such as stearyl alcohol, behenyl alcohol, and the like.

Various combinations of such functional fluorine-free hydrocarbon compounds can be used if desired to make compounds of the disclosure.

The isocyanate-derived linking group of the fluorinated compounds described herein, which links the fluorochemical oligomeric portion to the fluorine-free hydrocarbon moiety, is a di-, tri-, or polymeric isocyanate-derived linking group. It may be aromatic or aliphatic, or a combination thereof. In certain embodiments, such linking group is derived from a di-, tri-, or poly-isocyanate. Preferably, such linking group is derived from an aromatic diisocyanate, aromatic triisocyanate, or an aromatic polyisocyanate. Such linking group may contain other isocyanate-derived groups such as uretdione, biuret, allophanate, and isocyanurate.

Examples of suitable aromatic diisocyanates include, 4,4'-methylenediphenylene diisocyanate (MDI), 4,6-di-(trifluoromethyl)-1,3-benzene diisocyanate, 2,4-toluene diisocyanate (2,4-TDI), 2,6-toluene diisocyanate, o-, m-, and p-xylylene diisocyanate, 4,4'-diisocyanatodiphenylether, 3,3'-dichloro-4,4'-diisocyanatodiphenylmethane, 4,5'-diphenyl diisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Examples of suitable aromatic triisocyantes include 4,4',4"-triphenylmethane triisocyanate. Examples of suitable aromatic polyisocyanates include polymethylenepolyphenylisocyanate (PAPI), Examples of suitable aliphatic diisocyanates include hexamethylenediisocyanate, cyclohexyldiisocyanate, hydrogenated MDI, isophoronediisocyanate, and the like. Examples of suitable aliphatic triisocyanates include hexamethylenediisocyanate biuret and isocyanurate, the isocyanurate of isophoronediisocynate, and the like.

Various combinations of such isocyanate-derived linking groups can be used if desired to make compounds of the disclosure.

The fluorinated compounds of the present disclosure include a group that imparts a durable property when the compound is applied to a fibrous substrate. Preferably, the group that imparts a durable property comprises a blocked isocyanate.

Durability can be achieved by any of a number of mechanisms of interaction between the fluorinated compound and a fibrous substrate. For example, interactions such as physical entanglement, or chemical interaction such as covalent bonding by way of nucleophilic, electrophilic, ionic, free radical, or like reactions, between the fluorinated compound and the fibrous substrate, or ionic bonding, can cause durability. Wool, leather, paper, cotton, and nylon variously comprise hydroxyl, amino, carboxyl, and carboxamido groups. Other fabrics such as some non-wovens are essentially non-functional but comprise polymer chains.

For the purposes of the present disclosure, "a group that imparts a durable property when the compound is applied to a fibrous substrate" designates a group that can interact with a fibrous substrate, such as a fabric, by any of the above-described mechanisms. Such groups can be easily selected by those skilled in the art as a function of the particular a fibrous substrate that is intended to be treated with the ultimate composition of the disclosure. Representative groups suitable for imparting durability include polymerizable olefin, olefin that can undergo a hydrosilation reaction, epoxy, amino, hydroxy, halo, haloformyl, aziridino, acid groups such as carboxy, sulfo, sulfino, sulfeno, dihydroxyphosphinyl, and hydroxyphosphinilidene, alkali metal and alkaline-earth metal salts thereof, amine salts thereof, quaternary ammonium salts thereof and the like, or amino and quaternary ammonium groups and salts thereof. Further, some of the above-described isocyanate derivatives are suitable to interact with some fibrous substrates.

A particularly preferred type of group that imparts a durable property when the compound is applied to a fibrous substrate, is a blocked isocyanate, i.e., the reaction product of an isocyanate and a blocking agent, wherein the blocking agent is removable from the isocyanate under the thermal conditions employed upon curing a fibrous substrate treated with a compound containing the blocked isocyanato group. Conventional isocyanate blocking agents include arylalcohols (e.g., phenol, cresols, nitrophenols, o- and p-chlorophenol, naphthols, 4-hydroxybiphenyl); C2 to C8 alkanone oximes (e.g., acetone oxime, butanone oxime); arylthiols (e.g., thiophenol); organic active hydrogen compounds (e.g., diethyl malonate, acetylacetone, ethyl acetoacetate, ethyl cyanoacetate, ε-caprolactam); sodium bisulfite; and hydroxylamine. Particularly preferred blocked isocyanates include those blocked with C2 to C8 alkanone oximes, particularly butanone oxime, as such blocked isocyanates can be de-blocked at a relatively low temperature, for example, during the process of curing a fibrous substrate that has been treated with the compound comprising the blocked isocyanato group.

Various combinations of blocking agents can be used if desired to make compounds of the disclosure.

Preferred fluorinated compounds of the present disclosure can be prepared, for example, by reacting a functional fluorochemical oligomer having the formula H—[(R$^f$-Q)C(R$^1$)—CH$_2$]$_m$—S—R$^2$-(T$^1$)$_p$ as described above, with a fluorine-free mono-, di-, or poly-alcohol; a di-, tri-, or poly-isocyanate; and a blocking agent. Conditions for preparation of such oligomer and fluorinated compounds of the present disclosure are analogous to those described in U.S. Pat. No. 5,276,175, column 14, lines 21 to 35; column 19, line 13 to column 20, line 34; and column 21, lines 27 to 68. Specific conditions are described in the Examples Section below.

The amount of functional fluorochemical oligomer is preferably at least 0.05, and more preferably at least 0.15, mole per equivalent isocyanate. The amount of functional fluorochemical oligomer is preferably no more than 0.66, and more preferably no more than 0.25, mole per equivalent isocyanate.

The amount of fluorine-free mono-, di-, or poly-alcohol is preferably at least 0.05, and more preferably at least 0.15, mole per equivalent isocyanate. The amount of fluorine-free mono-, di-, or poly-alcohol is preferably no more than 0.66, and more preferably no more than 0.35 mole per equivalent isocyanate.

The amount of blocking agent is preferably at least 0.33, and more preferably at least 0.5, mole per equivalent isocyanate. The amount of blocking agent is preferably no more than 0.7, and more preferably no more than 0.67, mole per equivalent isocyanate.

The sum of the moles fluorochemical oligomer+fluorine-free alcohol+blocking agent is preferably approximately equal to the equivalents of isocyanate used, although slight variations are allowable as would be appreciated by one of skill in the art.

The fluorochemical treatment compositions comprise aqueous dispersions, suspensions, emulsions, solutions, or organic solvent (or organic solvent/water) solutions, dispersions, suspensions, or emulsions of one or more of the fluorinated compounds of the present disclosure. When applied as coatings, the fluorochemical compositions of the present disclosure impart oil and/or water-repellency properties, and/or stain-resistance characteristics to a wide variety of fibrous substrates.

One or more fluorinated compounds (i.e., fluorochemical compounds) of the present disclosure can be dissolved, suspended, or dispersed in a variety of solvents to form fluorochemical treatment compositions suitable for coating onto a fibrous substrate. Generally, the solvent solutions can contain at least 0.1% by weight non-volatile solids (based on the total weight of the components). Generally, the solvent-based compositions can contain no greater than 90%, and preferably no greater than 50%, by weight non-volatile solids (based on the total weight of the components). Aqueous dispersions, suspensions, emulsions, or solutions are generally preferred and generally contain a non-volatile solids content of at least 0.1%, and preferably, at least 1%, by weight (based on the total weight of the components). Aqueous dispersions, suspensions, emulsions, or solutions are generally preferred and generally contain a non-volatile solids content of no greater than 50%, and preferably, no greater than 40%, by weight (based on the total weight of the components). Suitable solvents include water, alcohols, esters, glycol ethers, amides, ketones, hydrocarbons, hydrofluorocarbons, hydrofluoroethers, chlorohydrocarbons, chlorocarbons, and mixtures thereof. Depending upon the fibrous substrate to which the composition is being applied, water is the preferred solvent due to environmental concerns.

In certain embodiments, co-solvents such as ethylene glycol, propylene glycol, dipropylene glycols, and dipropylene glycol ethers (e.g., dipropylene glycol monomethylether), are included, particularly for freeze protection. Preferably, a co-solvent is present in an amount of at least 5 weight percent (wt-%), based on the total weight of the composition. Preferably, a co-solvent is present in an amount of no greater than 30 wt-%, and more preferably no greater than 10 wt-%, based on the total weight of the composition.

A fluorochemical treatment composition containing one or more fluorinated compounds of the present disclosure is preferably used as an aqueous composition, in particular, an aqueous dispersion in water. The fluorochemical composition present in the fluorochemical treatment is usually made in solution in a solvent. It can be dispersed in water through vigorously mixing and homogenizing with the help of a surfactant or emulsifier and subsequent homogenization, for example, by a Manton Gaulin homogenizer or ultrasound homogenizer. An organic solvent-free dispersion can be obtained by subsequent distillation of the solvent.

Fluorochemical treatment compositions of the present disclosure can include conventional cationic, nonionic, anionic, and/or zwitterionic (i.e., amphoteric) surfactants (i.e., emulsifiers). Typically, a mixture of surfactants is used, the mixture preferably containing nonionic and ionic surfactants. The ionic co-surfactants can be anionic, cationic, or amphoteric in nature.

Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodiumdodecylbenzenesulphonate (available from Rhodia, France), and the like. Suitable amphoteric surfactants include cocobetaines, sulphobetaines, amine-oxides, and the like.

In certain embodiments, surfactants suitable for use in the fluorochemical compositions of the present disclosure are preferably of the following formula (Formula III):

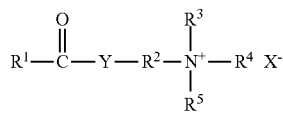

wherein:
each $R^1$ is independently a long chain, linear or branched, saturated or unsaturated, aliphatic group having 6 to 24 carbon atoms (in certain embodiments $R^1$ is saturated, and in certain embodiments $R^1$ includes 1, 2, or 3 unsaturated carbon-carbon bonds), or mixtures thereof;
each $R^2$ is independently a divalent alkylene group having 1 to 4 carbon atoms;
$R^3$ is an alkyl group having 1 to 4 carbon atoms;

$R^4$ and $R^5$ are each independently —$CH_2C(O)OH$, —$CH_2CH_2OH$, —$(R^2O)_n$—H, an alkyl group having 1 to 4 carbon atoms, or —$R^2$—Y—C(O)—$R^1$, with the proviso that only one of $R^4$ or $R^5$ can be —$R^2$—Y—C(O)—$R^1$ in any one compound;
each Y is independently O or NH;
n is 1-10; and
$X^-$ is an anion.

Such compounds are referred to generally as esterquat and amidequat surfactants.

In certain embodiments, esterquat and amidequat surfactants suitable for use in the fluorochemical compositions of the present disclosure are preferably of the following formula (Formula IV):

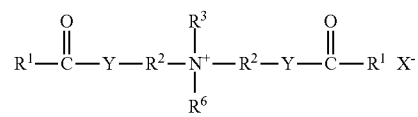

wherein:
each $R^1$ is independently a long chain, linear or branched, saturated or unsaturated, aliphatic group having 6 to 24 carbon atoms (in certain embodiments $R^1$ is saturated, and in certain embodiments $R^1$ includes 1, 2, or 3 unsaturated carbon-carbon bonds) or mixtures thereof;
each $R^2$ is independently a divalent alkylene group having 1 to 4 carbon atoms;
$R^3$ is an alkyl group having 1 to 4 carbon atoms;
$R^6$ is an alkyl group having 1 to 4 carbon atoms or —$(R^2O)_n$—H (preferably an alkyl group having 1 to 4 carbon atoms);
each Y is independently O or NH;
n is 1-10; and
$X^-$ is an anion.

Preferred esterquats within the scope of the surfactants of Formula IV are of the following formula (Formula V):

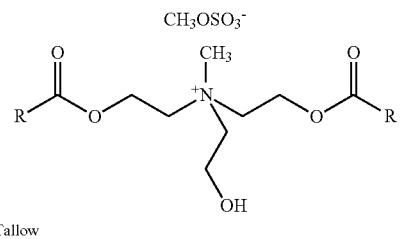

R = Tallow wherein "tallow" corresponds to mixtures of aliphatic tails containing saturated C16 to C20 chains and C18 mono or di-unsaturated chains. In certain embodiments, the composition of the aliphatic tails is derived from a mixture of fatty acids that is typically as follows: saturated fatty acids (palmitic acid, stearic acid, and myristic acid); monounsaturated fatty acids (oleic acid and palmitoleic acid); and polyunsaturated fatty acids (linoleic acid and linolenic acid). Such materials are available from Stepan Company.

Another preferred esterquat within the scope of Formula IV is of the following formula: $(R^7C(O)OCH_2CH_2)_2$—N$(CH_3)_2{}^+Cl^-$ wherein $R^7$ is a C12-C18 aliphatic chain. Such materials are available from Akzo Nobel as is available, for example, under the trade name ARMOCARE VGH-70.

Preferred amidequats within the scope of the surfactants of Formula IV are of the following formula (Formula VI):

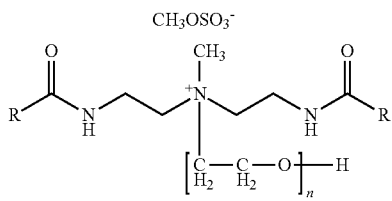

R = Hydrogenated Tallow
n = 1 to 10.

wherein "hydrogenated tallow" corresponds to a mixture of saturated fatty acid chains corresponding to the hydrogenated analogue of the "tallow" chains mentioned above.

In certain embodiments, amidequat surfactants suitable for use in the fluorochemical compositions of the present disclosure are preferably of the following formula (Formula VII):

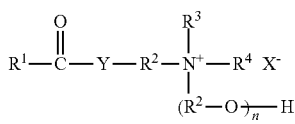

wherein:
  each $R^1$ is independently a long chain, linear or branched, saturated or unsaturated, aliphatic group having 6 to 24 carbon atoms (in certain embodiments $R^1$ is saturated, and in certain embodiments $R^1$ includes 1, 2, or 3 unsaturated carbon-carbon bonds), or mixtures thereof;
  $R^2$ is a divalent alkylene group having 1 to 4 carbon atoms;
  $R^3$ is an alkyl group having 1 to 4 carbon atoms;
  $R^4$ is —$CH_2C(O)OH$, —$CH_2CH_2OH$, —$CH_2CH_2OCH_2CH_2OH$, or an alkyl group having 1 to 4 carbon atoms;
  each Y is NH;
  n is 2; and
  $X^-$ is an anion.

Preferred amidequats within the scope of the compounds of Formula VII are those described in U.S. Pat. No. 7,807,614, and in particular Example P2.

In the surfactants described above in Formulas III through VII, in certain embodiments, each $R^1$ is independently a long chain saturated or unsaturated aliphatic group having 8-22 carbon atoms or mixtures thereof. In certain embodiments, each $R^1$ is independently a long chain saturated or unsaturated aliphatic group having 12-22 carbon atoms or mixtures thereof. In certain embodiments, each $R^1$ is independently a long chain saturated or unsaturated aliphatic group having 14-18 carbon atoms. In certain embodiments, each $R^1$ is independently a long chain saturated alkyl group or mixtures thereof.

In the surfactants described above in Formulas III through VII, in certain embodiments, $R^1$ includes 1 or 2 unsaturated carbon-carbon bonds. In certain embodiments, $R^1$ includes 1 unsaturated carbon-carbon bond.

In the surfactants described above in Formulas III through VII, in certain embodiments, each $R^2$ is independently a divalent alkylene group having 2 to 4 carbon atoms. In certain embodiments, each $R^2$ is independently a divalent alkylene group having 2 to 3 carbon atoms. In certain embodiments, each $R^2$ is independently a divalent alkylene group having 2 carbon atoms.

In the surfactants described above in Formulas III through VII, in certain embodiments, $R^3$ is methyl or ethyl. In certain embodiments, $R^3$ is methyl.

In the surfactants described above in Formulas III through VII, in certain embodiments, $R^6$ is methyl or ethyl. In certain embodiments, $R^6$ is methyl.

In the surfactants described above in Formulas III through VII, in certain embodiments, n is 1 to 4. In certain embodiments, n is 1 or 2. In certain embodiments, n is 1.

In the surfactants described above in Formulas III through VII, in certain embodiments, the anion $X^-$ is selected from the group consisting of $I^-$, $Cl^-$, $Br^-$, $SO_4^-$, $PO_4^-$, $NO_3^-$, $CH_3COO^-$, $CH_3OSO_3^-$, $CF_3OSO_3^-$, alkyl sulfates, alkyl carbonates, and alkyl phosphates. In certain embodiments, the anion $X^-$ is selected from the group consisting of $I^-$, $Cl^-$, $Br^-$, $SO_4^-$, $PO_4^-$, $NO_3^-$, $CH_3COO^-$, $CH_3OSO_3^-$, and $CF_3SO_3^-$.

Various combinations of the listed groups can be incorporated into any one compound.

In certain embodiments herein, one or more esterquat and/or amidequat surfactants are present in a fluorochemical composition in an amount of greater than 3 wt-%, based on the total weight of the solids of the fluorochemical composition (not including water and co-solvent). Preferably, one or more esterquat and/or amidequat surfactants are present in a fluorochemical composition in an amount of at least 5 wt-%, based on the total weight of the solids of the fluorochemical composition. Preferably, one or more esterquat and/or amidequat surfactants are present in a fluorochemical composition in an amount of no more than 20 wt-%, based on the total weight of the solids of the fluorochemical composition. Preferably, one or more esterquat and/or amidequat surfactants are present in a fluorochemical composition in an amount of no more than 10 wt-%, based on the total weight of the solids of the fluorochemical composition.

Further descriptions of the surfactants of Formulas III through VII are described in Applicants' Assignee's application Ser. No. 61/637,680, filed on Apr. 24, 2012, Ser. No. 61/656,740, filed on Jun. 7, 2012, and Ser. No. 61/637,680, filed on even date herewith, all of which are entitled Surfactant-Containing Fluorochemical Compositions, Articles, and Methods.

To prepare the aqueous dispersions, the fluorinated compounds, together with one or more surfactants (preferably, nonionic surfactants), and, if appropriate, other auxiliaries and solvents, are vigorously dispersed in water, a relatively large amount of energy being supplied. To facilitate the preparation of the dispersion, the oligomer product may be dissolved first in solvent or mixture of solvents, and the dispersion is advantageously carried out in two separate steps, predispersion being carried out first, followed by fine dispersion. Predispersion can also be carried out by using high shearing forces, for example, by using a high-speed stirrer, such as a dispersing machine of the ULTRATURAX type, and the predispersion thereby obtained is then subjected, for example, to ultrasonic treatment or treatment in a high pressure homogenizer. After this treatment, the particle size in the dispersion generally will be equal to or less than 1 micron (μm) to the extent of more than 80%, preferably to the extent of more than 90%. Preferably the average particle size is below 200 nanometers, even more preferably below 150 nanometers, or even below 120 nanometers. Generally, the aqueous dispersion as a concentrate contains 5% to 50% by weight of an active composition (one or more fluorochemical compounds), 0.5% to 15% by weight of one or more surfactants, and 0 to 30% by weight of a co-solvent or co-solvent mixture, the remainder being water. Organic solvent-free dispersions can be prepared by removing the solvent by distillation.

Mixtures of water-insoluble solvents with water-soluble solvents can be employed as the solvent for preparation of the dispersion, the amount of the water-insoluble solvent in most cases being greater than the water-soluble solvent. Suitable water-soluble solvents are, for example, mono- or di-alcohols, lower ketones, polyglycol esters, and polyglycol ethers, or mixtures of such solvents. Examples of water-insoluble solvents are esters, ethers, and higher ketones. Low-boiling solvent portions can be removed by, for example, distillation, at a later time, if desired. Preferred water-insoluble solvents are esters or ketones, such as ethyl acetate, butyl acetate, and methyl ethyl ketone.

The amount of the fluorochemical composition applied to a fibrous substrate in accordance with this disclosure is chosen so that sufficiently high or desirable water and/or oil repellencies are imparted to the substrate surface, said amount usually being such that 0.01% to 5% by weight, preferably 0.05% to 2% by weight, of the fluorinated compound is present on the treated substrate. The amount which is sufficient to impart desired repellency can be determined empirically and can be increased as necessary or desired.

Another embodiment of the present disclosure is an article having a cured coating derived from the fluorochemical composition of the present disclosure and optionally a co-solvent. After application and curing of the coating composition, the article exhibits durable oil- and/or water-repellency. The coating compositions of the present disclosure can be applied to a wide variety of fibrous substrates. Fibrous substrates include woven, knit, and nonwoven fabrics, textiles, carpets, leather, and paper.

Fibrous substrates are capable of imbibing a liquid and are therefore porous. Preferred substrates are textiles such as cotton, wool, polyester, nylon, and blends thereof. Particularly preferred substrates are synthetic substrates. Such substrates are particularly subject to staining and soiling, but also benefit greatly from the fluorochemical compositions of the present disclosure because the coating composition can penetrate into the fibrous or porous substrate surface and spread over the internal surfaces of the substrate. Preferred fibrous substrates that can be coated with the coating composition of the present disclosure are nonwoven, knits, and woven fabrics, carpet, drapery material, upholstery, clothing and essentially any textile. The fibrous substrate can be in the form of a yarn, toe, web, or roving, or in the form of fabricated textiles such as carpets, woven and nonwoven fabrics, etc.

To impart one or more repellency characteristics to a fibrous substrate, having one or more surfaces, (a) the coating composition is applied onto one or more surfaces of the substrate and (b) the coating composition is cured (e.g., dried) at ambient or room temperature or preferably at elevated temperatures. The use of elevated temperatures is particularly advantageous for curing fibrous substrates, since best repellency properties are then achieved. Elevated temperatures of at least 50° C. are preferred with at least 100° C. more preferred. Curing temperatures are typically no more than 150° C.

The coating compositions comprising the fluorochemical composition can be applied to a treatable substrate by standard methods such as, for example, spraying, padding, foaming, dipping, roll coating, brushing, or exhaustion (optionally followed by the drying of the treated substrate to remove any remaining water or co-solvent). When coating flat substrates of appropriate size, knife-coating or bar-coating may be used to ensure uniform coatings of the substrate. If desired, the fluorochemical composition can be co-applied with conventional fiber treating agents, for example, spin finishes or fiber lubricants.

Additionally, the compositions of the disclosure may also include other fluorinated or non-fluorinated repellent materials, softeners, anti stats, anti dust mite or anti microbial additives.

Illustrative Embodiments

1. A fluorinated compound comprising:
  (i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
    the polymerized (meth)acrylate units are present in a molar ratio of at least 6:1 relative to the functionalized chain transfer agent; and
    the (meth)acrylate units comprise 0-30 mole-% acrylate units and 70-100 mole-% methacrylate units;
  (ii) a fluorine-free hydrocarbon moiety;
  (iii) a di-, tri-, or polymeric isocyanate-derived linking group; and
  (iv) a group that imparts a durable property when the compound is applied to a fibrous substrate.
2. The fluorinated compound of embodiment 1 wherein the polymerized (meth)acrylate units are present in a molar ratio of at least 8:1 relative to the functionalized chain transfer agent.
3. The fluorinated compound of embodiment 1 or 2 wherein the polymerized (meth)acrylate units are present in a molar ratio of no more than 20:1 relative to the functionalized chain transfer agent.
4. The fluorinated compound of any one of the previous embodiments wherein the fluorochemical oligomeric portion comprises co-oligomeric acrylate units and methacrylate units.
5. The fluorinated compound of any one of embodiments 1 through 3 comprising a homo-oligomeric portion of methacrylate units.
6. The fluorinated compound of any one of the previous embodiments wherein the fluorochemical oligomeric portion further comprises polymerized fluorine-free (meth)acrylate monomeric units.
7. The fluorinated compound of any one of the previous embodiments wherein the fluorochemical oligomeric portion is derived from a functional fluorochemical oligomer having the formula (Formula I):

$$H\text{—}[(R^f\text{-}Q)C(R^1)\text{—}CH_2]_m\text{—}S\text{—}R^2\text{-}(T^1)_p$$

wherein:
  each $R^f$ is independently a perfluorinated terminal C4-C6 aliphatic group;
  each Q is independently an organic linking group;
  each $R^1$ is independently H or methyl;
  m is at least 6;
  $R^2$ is a divalent or trivalent organic linking group;
  $T^1$ is —OH or —$NH_2$; and
  p is 1 or 2.
8. The fluorinated compound of any one of the previous embodiments wherein the fluorine-free hydrocarbon moiety is derived from a mono-, di-, or poly-functional fluorine-free hydrocarbon compound reactive with an isocyanate.

9. The fluorinated compound of any one of the previous embodiments wherein the isocyanate-derived linking group is derived from an aromatic diisocyanate, aromatic triisocyanate, or an aromatic polyisocyanate.

10. The fluorinated compound of any one of the previous embodiments wherein the group that imparts a durable property comprises a blocked isocyanate.

11. A fluorinated compound prepared by reacting components comprising:
   (i) a functional fluorochemical oligomer having the formula (Formula I):

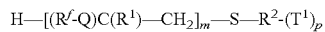

wherein:
   each $R^f$ is independently a perfluorinated terminal C4-C6 aliphatic group;
   each Q is independently an organic linking group;
   each $R^1$ is independently H or methyl, with the proviso that 0-30 mole-% of the $R^1$ groups are H and 70-100 mole-% of the $R^1$ groups are methyl;
   m is at least 6;
   $R^2$ is a divalent or trivalent organic linking group;
   $T^1$ is —OH or —NH$_2$; and
   p is 1 or 2;
   (ii) a fluorine-free mono-, di-, or poly-alcohol;
   (iii) a di-, tri-, or poly-isocyanate; and
   (iv) a blocking agent.

12. A fluorochemical composition comprising at least one fluorinated compound comprising:
   (i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
      the polymerized (meth)acrylate units are present in a molar ratio of at least 6:1 relative to the functionalized chain transfer agent; and
      the (meth)acrylate units comprise 0-30 mole-% acrylate units and 70-100 mole-% methacrylate units;
   (ii) a fluorine-free hydrocarbon moiety;
   (iii) a di-, tri-, or polymeric isocyanate-derived linking group; and
   (iv) a group that imparts a durable property when the compound is applied to a fibrous substrate.

13. The fluorochemical composition of embodiment 12 comprising a mixture of the fluorinated compounds, wherein no more than 30 mole-% of the mixture of fluorinated compounds comprises acrylate units.

14. The fluorochemical composition of embodiment 12 comprising a mixture of the fluorinated compounds, wherein the mixture of fluorinated compounds comprises:
   at least one fluorinated compound comprising a homo-oligomeric portion of acrylate units; and
   at least one fluorinated compound comprising a homo-oligomeric portion of methacrylate units;
   wherein the amount of acrylate homo-oligomer is no more than 30 mole-% of the total amount of (meth)acrylate units in the mixture of fluorinated compounds.

15. A fluorochemical treatment composition comprising:
   water,
   one or more surfactants; and
   at least one fluorinated compound comprising:
      (i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
         the polymerized (meth)acrylate units are present in a molar ratio of at least 6:1 relative to the functionalized chain transfer agent; and
         the (meth)acrylate units comprise 0-30 mole-% acrylate units and 70-100 mole-% methacrylate units;
      (ii) a fluorine-free hydrocarbon moiety;
      (iii) a di-, tri-, or polymeric isocyanate-derived linking group; and
      (iv) a group that imparts a durable property when the compound is applied to a fibrous substrate.

16. The fluorochemical treatment composition of embodiment 15 comprising a mixture of nonionic and ionic surfactants.

17. The fluorochemical treatment composition of embodiment 15 or 16 wherein at least one surfactant has the following formula (Formula III):

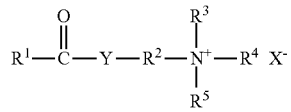

wherein:
   each $R^1$ is independently a long chain, linear or branched, saturated or unsaturated, aliphatic group having 6 to 24 carbon atoms, or mixtures thereof;
   each $R^2$ is independently a divalent alkylene group having 1 to 4 carbon atoms;
   $R^3$ is an alkyl group having 1 to 4 carbon atoms;
   $R^4$ and $R^5$ are each independently —CH$_2$C(O)OH, —CH$_2$CH$_2$OH,
   —(R$^2$O)$_n$—H, an alkyl group having 1 to 4 carbon atoms, or —R$^2$—Y—C(O)—R$^1$, with the proviso that only one of $R^4$ or $R^5$ can be —R$^2$—Y—C(O)—R$^1$ in any one compound;
   each Y is independently 0 or NH;
   n is 1-10; and
   $X^-$ is an anion.

18. The fluorochemical treatment composition of embodiment 17 wherein at least one surfactant has the following formula (Formula IV):

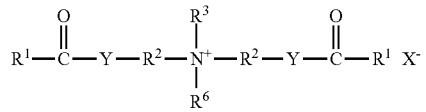

wherein:
   each $R^1$ is independently a long chain, linear or branched, saturated or unsaturated, aliphatic group having 6 to 24 carbon atoms, or mixtures thereof;
   each $R^2$ is independently a divalent alkylene group having 1 to 4 carbon atoms;
   $R^3$ is an alkyl group having 1 to 4 carbon atoms;
   $R^6$ is an alkyl group having 1 to 4 carbon atoms or —(R$^2$O)$_n$—H;
   each Y is independently 0 or NH;
   n is 1-10; and
   $X^-$ is an anion.

19. The fluorochemical treatment composition of embodiment 17 or 18 wherein the at least one surfactant of Formula III or Formula IV is present in an amount of greater than 3 wt-% based on fluorochemical solids.
20. The fluorochemical treatment composition of embodiment 19 wherein the at least one surfactant of Formula III or Formula IV is present in an amount of no greater than 20 wt-% based on fluorochemical solids.
21. The fluorochemical treatment composition of any one of embodiments 17 through 20 wherein the at least one surfactant of Formula III or Formula IV is the only surfactant present.
22. A method of imparting repellency to a fibrous substrate having one or more surfaces, the method comprising:
   applying a fluorochemical treatment composition of any one of embodiments 15 through 21 onto one or more surfaces of the fibrous substrate; and
   curing the fluorochemical treatment composition.
23. An article comprising:
   a fibrous substrate having one or more surfaces treated according to the method of embodiment 22.

EXAMPLES

Objects and advantages of this disclosure are further illustrated by the following examples, but the particular materials and amounts thereof recited in these examples, as well as other conditions and details, should not be construed to unduly limit this disclosure.

Materials utilized for the examples are shown in Table 1.

a simulated rainfall, while the back of the substrate is rubbed. The appearance of the upper, exposed surface is checked visually after 1, 5, and 10 minutes and is given a rating between 1 (complete surface wetting) and 5 (no water remains on the surface).

Water Penetration

During the Bundesmann test, the volume of water penetrating through the fabric is collected and measured. Well-treated samples give low penetration results.

Spray Rating (SR)

The spray rating of a treated substrate is a value indicative of the dynamic repellency of the treated substrate to water that impinges on the treated substrate. The repellency is measured by Test Method 22-1996, published in the 2001 Technical Manual of the American Association of Textile Chemists and Colorists (AATCC), and is expressed in terms of a 'spray rating' of the tested substrate. The spray rating is obtained by spraying 250 ml water on the substrate from a height of 15 cm. The wetting pattern is visually rated using a 0 to 100 scale, where 0 means complete wetting and 100 means no wetting at all. Spray rating is measured initially and after the fabric is laundered 5 times.

The laundering procedure consisted of placing a 400-900 $cm^2$ sheet of treated substrate in a washing machine (Miele Novotronic T490) along with ballast sample (1.9 kg of 8 or fabric). A commercial detergent ("Sapton", available from Henkel, Germany, 46 g) is added. The substrate and ballast load are washed using a short wash cycle at 40° C., followed

TABLE 1

Materials List

| Material | Description | Source |
| --- | --- | --- |
| MeFBSEMA | N-methyl perfluorobutylsulphonamidoethyl-methacrylate | See Example 1A and Example 2, sections A, B, and C in U.S. Pat. No. 6,664,354 |
| MeFBSEA | N-methyl perfluorobutylsulphonamidoethyl-acrylate | See Example 2, section A and B in U.S. Pat. No. 6,664,354 |
| C6 Telomer MA | $C_6F_{13}CH_2CH_2OC(O)C(CH_3)=CH_2$ | ABCR, Germany |
| 2-mercaptoethanol | 2-mercaptoethanol | Sigma-Aldrich, Belgium |
| V-59 | 2,2'-Azobis(2-methylbutyronitrile) | Wako Pure Chemical Industries, Ltd., Germany |
| Ethylacetate | Ethylacetate | Sigma-Aldrich, Belgium |
| SA | Stearylalcohol | Sigma-Aldrich, Belgium |
| PAPI | Voronate M 220, Low Viscosity Polymethylene Polyphenylisocyanate | Dow Chemical, Netherlands |
| DBTDL | Dibutyltin diLaurate | Sigma-Aldrich, Belgium |
| MEKO | 2-butanoneoxime | Sigma-Aldrich, Belgium |
| Propyleneglycol | 1,2 Propanediol, $OHCH_2CH(OH)CH_3$ | Sigma-Aldrich, Belgium |
| VGH-70 | Dipalmitoylethyldimethyl amonium chloride | AkzoNobel, Netherlands |
| UNILIN 350 | Fully saturated, long chain, linear primary alcohols, OH equivalent of 434 | Baker Hughes, Houston, TX |
| PES Microfiber | Polyester fabric | Chyang Sheng Dyeing and Finishing Company Ltd., Taiwan |
| PA Microfiber | Polyamide fabric, style 6145 | Sofinal NV, Belgium |
| N-100 | Aliphatic hexamethylene diisocyanate (HDI) biuret | Bayer AG, Germany |
| N-3300 | Aliphatic hexamethylene diisocyanate (HDI) biuret | Bayer AG, Germany |

Test Methods
Bundesmann

The impregnating effect of rain on treated substrates is determined using the Bundesmann Test Method (DIN 53888). In this test, the treated substrates were subjected to by a rinse cycle and centrifuging. The sample is not dried between repeat cycles. After 5 cycles, the substrate is hung on a support and dried at room temperature (about 20° C.) for 4 hours. After drying, the samples are pressed using an iron at 160° C. for 15 seconds.

Examples 1-16 a. Example 1

Oligomerization

In a three necked flask fitted with a stirrer, heating mantle, thermometer, and cooler, were placed 1000 g (2.4 equivalent) of MeFBSEMA, 15.3 g (0.2 equivalent) 2-mercaptoethanol, and 338.4 g ethylacetate. The mixture was heated to 40° C. under nitrogen and degassed with vacuum. To this flask was added 2.55 g V-59 initiator and the mixture was heated to about 75° C. for 3 hours. A second aliquot of 2.55 g V-59 initiator was then added to the flask and heating was continued under nitrogen for 16 hours. A third charge of 2.55 g V-59 was then added and the reaction continued for 8 hours. A clear, viscous solution of oligomeric fluorochemical alcohol was obtained at 75% solids. This fluorochemical oligomer comprised, on average, 12 fluorochemical methacrylate (MA) groups per 1 alcohol group and was labeled MA12. All fluorochemical oligomers used throughout the examples are identified in a similar fashion as MA or acrylate (A).

Urethane Reaction

In a three necked flask fitted with a stirrer, heating mantle, thermometer, and cooler were placed 1353.7 g (0.2 equivalent) MA12, 53 g (0.2 equivalent) SA, and 1537 g ethylacetate. About 100 g ethylacetate were distilled off, and the flask cooled to about 40° C. under nitrogen. To this flask were then added 133.3 g (0.98 equivalent) PAPI and 2.5 g DBTDL and the mixture was heated to 80° C. under nitrogen for 8 hours. To this was then added 48.3 g (0.55 equivalent) MEKO and the reaction continued for 2 hours. A clear urethane solution was obtained (Composition A).

Compositions B through Q were prepared in a similar fashion. Compositions comprising both a methacrylate and acrylate were co-oligomerized with the exception of Composition L in which a blend of the homo-methacrylate oligomer and homo-acrylate oligomer was used in the urethane reaction.

Emulsification

In a three necked flask were placed 3125.3 g of the clear urethane solution and ethylacetate (40% solids). The solution was heated to about 70° C. In a second 3-necked flask were placed 2730 g deionized water, 354 g propyleneglycol, and 125 g VGH-70. This mixture was heated to about 70° C. The hot water phase was then added to the hot ethylacetate phase and mixed vigorously for about 30 minutes, until a stable pre-emulsion was formed. This hot pre-emulsion was then passed twice through a heated Manton-Gaulin homogenizer (Lab 60, APV Belgium, Diegem, Belgium) at 300 bar and about 67° C. A thick liquid was obtained. Ethylacetate was stripped from the emulsion at about 50-60° C. and reduced pressure of about 30 mm Hg to obtain an aqueous dispersion at about 30% solids. The dispersion was filtered through a 100 micron polypropylene filter bag. The average particle size was about 90-110 nm.

b. Examples 2-16

Examples 2-16 were prepared per Example 1, with the compositions shown in Tables 2 to 4.

Comparatives

Comparatives C1-C7 were prepared per Example 1, with the compositions shown in Tables 2-4.

Results

Compositions are described in Table 2 and the mixing ratios are shown in Tables 3 and 4. The Examples and Comparatives were coated on fabric at approximately 0.3% SOF (solids on fabric) and cured for 2 minutes at 170° C. The fabric test results are shown in Tables 3 and 4.

TABLE 2

Formulation Compositions

| Composition | Isocyanate | Fluorine-Free Alcohol | Fluorochemical Oligomer | Acrylate Mol % | Blocking Agent |
|---|---|---|---|---|---|
| A | PAPI | SA | MA12 | 0 | MEKO |
| B | PAPI | SA | MA6 | 0 | MEKO |
| C | PAPI | SA | MA8 | 0 | MEKO |
| D | PAPI | SA | MA10 | 0 | MEKO |
| E | N-100 | SA | MA12 | 0 | MEKO |
| F | N-3300 | SA | MA12 | 0 | MEKO |
| G | PAPI | SA | MA16 | 0 | MEKO |
| H | PAPI | SA | MA8A2 | 20 | MEKO |
| I | PAPI | SA | MA10A2 | 17 | MEKO |
| J | PAPI | UNILIN-350 | MA12 | 0 | MEKO |
| K | PAPI | SA | Blend of MA12 and A4 | 2.5 | MEKO |
| L | PAPI | SA | C6 Telomer MA12 | 0 | MEKO |
| M | PAPI | SA | MA4 | 0 | MEKO |
| N | PAPI | SA | MA4A4 | 50 | MEKO |
| O | PAPI | SA | A4 | 100 | MEKO |
| P | PAPI | SA | A12 | 100 | MEKO |

TABLE 3

Examples, Comparatives and Test Results on PES Microfiber

| Example | Composition | Equivalent Ratio[a] | Bundesmann | Penetration (mL) | SR (initial) | SR (5 Cycles) |
|---|---|---|---|---|---|---|
| 1 | A | 1/1/3/1 | 5-5-4 | 8 | 100 | 100 |
| 2 | A | 0.6/0.6/3/1.8 | 5-5-4 | 6 | 100 | 100 |
| 3 | B | 0.9/0.6/3/1.5 | 4-3-3 | 1 | 100 | 100 |
| 4 | C | 1/1/3/1 | 5-4-3 | 9 | 100 | 90 |
| 5 | D | 0.6/0.7/3/1.7 | 5-4-4 | 1 | 100 | 100 |
| 6 | E | 0.6/0.6/3/1.8 | 4-3-2 | 26 | 100 | 90 |
| 7 | F | 0.6/0.6/3/1.8 | 4-3-3 | 21 | 100 | 90 |
| 8 | G | 0.5/0.7/3/1.8 | 4-4-4 | 1 | 100 | 100 |
| 9 | H | 0.6/0.6/3/1.8 | 5-4-3 | 14 | 100 | 90 |
| 10 | I | 0.6/0.6/3/1.8 | 5-4-3 | 14 | 100 | 90 |
| 11 | J | 0.6/0.6/3/1.8 | 5-5-4 | 8 | 100 | 100 |

TABLE 3-continued

Examples, Comparatives and Test Results on PES Microfiber

| | Composition | Equivalent Ratio[a] | Bundesmann | Penetration (mL) | SR (initial) | SR (5 Cycles) |
|---|---|---|---|---|---|---|
| 12 | K | 0.54/0.06/0.6/3/1.8[b] | 5-4-4 | 10 | 100 | 90 |
| 13 | L | 0.6/0.6/3/1.8 | 5-5-5 | 8 | 100 | 100 |
| Comparatives | | | | | | |
| C1 | M | 1/1/3/1 | 4-1-1 | 56 | 100 | 70 |
| C2 | N | 0.6/0.6/3/1.8 | 3-1-1 | 60 | 100 | 50 |
| C3 | O | 1/1/3/1 | 1-1-1 | 79 | 80 | 50 |
| C4 | P | 0.6/0.6/3/1.8 | 3-1-1 | 68 | 90 | 50 |

[a]Equivalents fluorochemical oligomer/fluorine-free alcohol/isocyanate/blocking agent
[b]Equivalents fluorochemical methacrylate oligomer/fluorochemical acrylate oligomer/fluorine-free alcohol/isocyanate/blocking agent

TABLE 4

Examples, Comparatives and Test Results on PA Microfiber

| | Composition | Equivalent Ratio[a] | Bundesmann | Penetration (mL) | SR (initial) | SR (5 Cycles) |
|---|---|---|---|---|---|---|
| Example | | | | | | |
| 14 | C | 0.9/0.9/3/1.2 | 3-1-1 | 35 | 100 | 70 |
| 15 | A | 0.6/0.6/3/1.8 | 3-1-1 | 33 | 100 | 70 |
| 16 | H | 0.6/0.6/3/1.8 | 3-1-1 | 45 | 100 | 70 |
| Comparatives | | | | | | |
| C5 | O | 1/1/3/1 | 1-1-1 | 81 | 80 | 0 |
| C6 | P | 0.6/0.6/3/1.8 | 1-1-1 | 86 | 85 | 0 |
| C7 | M | 0.6/0.6/3/1.8 | 1-1-1 | 76 | 100 | 0 |

[a]Equivalents fluorochemical oligomer/fluorine-free alcohol/isocyanate/blocking agent The effect of the number of methacrylate repeating units is demonstrated by comparing Example 4 (8 repeating units) and C1 (4 repeating units). Example 4 has higher Bundesmann, lower penetration, and a higher spray rating after laundering. Although Example 3 (6 repeating units) utilizes a different equivalent ratio than C1, better performance is also observed.

The effect of amount of acrylate repeating units may be assessed by comparing Example 9 (20% acrylate repeating units) and C2 (50% acrylate repeating units). The Example composition provides increased performance. In addition, better performance is observed in Examples 6 and 7 (0% acylate repeating units) compared to C4 (100% acrylate repeating units).

The examples demonstrate preferred fluorochemical treatment compositions of the present disclosure possess one or more of the following characteristics: good water repellency when applied to a fibrous substrate, particularly polyester and polyamide fabrics, as demonstrated by a 100 spray rating of a treated substrate (treated and tested according to the Spray Rating procedure in the Examples Section); good dynamic water repellency when applied to a fibrous substrate, particularly polyester and polyamide fabrics, as demonstrated by no greater than 50 ml water penetration and no greater than 40% water absorption of a treated substrate (treated and tested according to the Water Penetration procedure in the Examples Section); durability after washing such that, after 5 launderings (as described in the Examples Section), a treated substrate demonstrates a Spray Rating of at least 70 (tested according to the Spray Rating procedure in the Examples Section); good dynamic water repellency, as demonstrated by a Bundesmann Test Method, wherein at least one of the three ratings (at 1, 5, or 10 minutes) is at least 2 when a polyamide fabric is treated, or all three ratings are at least 2 when a polyester fabric is treated.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:
1. A fluorinated compound comprising:
(i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
the polymerized (meth)acrylate units are present in a molar ratio of at least 6:1 relative to the functionalized chain transfer agent; and
the (meth)acrylate units comprise 0-30 mole-% acrylate units and 70-100 mole-% methacrylate units;
(ii) a fluorine-free hydrocarbon moiety;
(iii) a di-, tri-, or polymeric isocyanate-derived linking group; and

(iv) a group that imparts durability to a fibrous substrate, wherein after 5 launderings, the fibrous substrate treated with the fluorinated compound demonstrates a Spray Rating of at least 70.

2. The fluorinated compound of claim 1 wherein the polymerized (meth)acrylate units are present in a molar ratio of at least 8:1 relative to the functionalized chain transfer agent.

3. The fluorinated compound of claim 1 wherein the polymerized (meth)acrylate units are present in a molar ratio of no more than 20:1 relative to the functionalized chain transfer agent.

4. The fluorinated compound of claim 1 wherein the fluorochemical oligomeric portion comprises co-oligomeric acrylate units and methacrylate units.

5. The fluorinated compound of claim 1 comprising a homo-oligomeric portion of methacrylate units.

6. The fluorinated compound of claim 1 wherein the fluorochemical oligomeric portion further comprises polymerized fluorine-free (meth)acrylate monomeric units.

7. The fluorinated compound of claim 1 wherein the fluorochemical oligomeric portion is derived from a functional fluorochemical oligomer having the formula (Formula I):

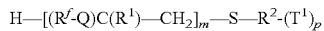

wherein:
each $R^f$ is independently a perfluorinated terminal C4-C6 aliphatic group;
each Q is independently an organic linking group;
each $R^1$ is independently H or methyl;
m is at least 6;
$R^2$ is a divalent or trivalent organic linking group;
$T^1$ is —OH or —NH$_2$; and
p is 1 or 2.

8. The fluorinated compound of claim 1 wherein the fluorine-free hydrocarbon moiety is derived from a mono-, di-, or poly-functional fluorine-free hydrocarbon compound reactive with an isocyanate.

9. The fluorinated compound of claim 1 wherein the isocyanate-derived linking group is derived from an aromatic diisocyanate, aromatic triisocyanate, or an aromatic polyisocyanate.

10. The fluorinated compound of claim 1 wherein the group that imparts durability comprises a polymerizable olefin group, an olefin group that undergoes a hydrosilation reaction, an epoxy group, a hydroxyl group, a halo group, a haloformyl group, an aziridino group, an acid group, an alkali metal salt of an acid group, an alkaline earth metal salt of an acid group, an amine salt of an acid group, a quaternary ammonium salt of an acid group, an amino group, a salt of an amino group, a quaternary ammonium group, a salt of a quaternary ammonium group, a blocked isocyanate group, or blocked isocyanate groups from a combination of blocking agents.

11. The fluorinated compound of claim 10 wherein the group that imparts durability comprises a blocked isocyanate.

12. A fluorinated compound prepared by reacting components comprising:
(i) a functional fluorochemical oligomer having the formula (Formula I):

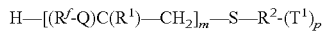

wherein:
each $R^f$ is independently a perfluorinated terminal C4-C6 aliphatic group;
each Q is independently an organic linking group;
each $R^1$ is independently H or methyl, with the proviso that 0-30 mole-% of the $R^1$ groups are H and 70-100 mole-% of the $R^1$ groups are methyl;
m is at least 6;
$R^2$ is a divalent or trivalent organic linking group;
$T^1$ is —OH or —NH$_2$; and
p is 1 or 2;
(ii) a fluorine-free mono-, di-, or poly-alcohol;
(iii) a di-, tri-, or poly-isocyanate; and
(iv) a blocking agent.

13. A fluorochemical composition comprising at least one fluorinated compound comprising:
(i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:
the polymerized (meth)acrylate units are present in a molar ratio of at least 6:1 relative to the functionalized chain transfer agent; and
the (meth)acrylate units comprise 0-30 mole-% acrylate units and 70-100 mole-% methacrylate units;
(ii) a fluorine-free hydrocarbon moiety;
(iii) a di-, tri-, or polymeric isocyanate-derived linking group; and
(iv) a group that imparts durability to a fibrous substrate, wherein after 5 launderings, the fibrous substrate treated with the fluorinated compound demonstrates a Spray Rating of at least 70.

14. The fluorochemical composition of claim 13 comprising a mixture of the fluorinated compounds, wherein no more than 30 mole-% of the mixture of fluorinated compounds comprises acrylate units.

15. The fluorochemical composition of claim 13 comprising a mixture of the fluorinated compounds, wherein the mixture of fluorinated compounds comprises:
at least one fluorinated compound comprising a homo-oligomeric portion of acrylate units; and
at least one fluorinated compound comprising a homo-oligomeric portion of methacrylate units;
wherein the amount of acrylate homo-oligomer is no more than 30 mole-% of the total amount of (meth)acrylate units in the mixture of fluorinated compounds.

16. The fluorochemical composition of claim 13 wherein the group that imparts durability comprises a polymerizable olefin group, an olefin group that undergoes a hydrosilation reaction, an epoxy group, a hydroxyl group, a halo group, a haloformyl group, an aziridino group, an acid group, an alkali metal salt of an acid group, an alkaline earth metal salt of an acid group, an amine salt of an acid group, a quaternary ammonium salt of an acid group, an amino group, a quaternary ammonium group, a salt of a quaternary ammonium group, a blocked isocyanate group, or blocked isocyanate groups from a combination of blocking agents.

17. A fluorochemical treatment composition comprising:
water,
one or more surfactants; and
at least one fluorinated compound comprising:
(i) a fluorochemical oligomeric portion comprising an aliphatic backbone comprising polymerized (meth)acrylate monomeric units, each having a perfluorinated terminal C4-C6 aliphatic group, and an organic residue obtained by removing a hydrogen atom from a functionalized chain transfer agent, wherein:

the polymerized (meth)acrylate units are present in a molar ratio of at least 6:1 relative to the functionalized chain transfer agent; and the (meth)acrylate units comprise 0-30 mole-% acrylate units and 70-100 mole-% methacrylate units;

(ii) a fluorine-free hydrocarbon moiety;

(iii) a di-, tri-, or polymeric isocyanate-derived linking group; and (iv) a group that imparts durability to a fibrous substrate, wherein after 5 launderings, the fibrous substrate treated with the fluorinated compound demonstrates a Spray Rating of at least 70.

18. The fluorochemical treatment composition of claim 17 comprising a mixture of nonionic and ionic surfactants.

19. The fluorochemical treatment composition of claim 17 wherein the surfactant has the following formula (Formula III):

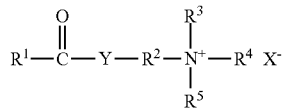

wherein:
each $R^1$ is independently a long chain, linear or branched, saturated or unsaturated, aliphatic group having 6 to 24 carbon atoms, or mixtures thereof;
each $R^2$ is independently a divalent alkylene group having 1 to 4 carbon atoms;
$R^3$ is an alkyl group having 1 to 4 carbon atoms;
$R^4$ and $R^5$ are each independently —CH$_2$C(O)OH, —CH$_2$CH$_2$OH, —(R$^2$O)$_n$—H, an alkyl group having 1 to 4 carbon atoms, or —R$^2$—Y—C(O)—R$^1$, with the proviso that only one of $R^4$ or $R^5$ can be —R$^2$—Y—C(O)—R$^1$ in any one compound;
each Y is independently O or NH;
n is 1-10; and
X$^-$ is an anion.

20. The fluorochemical treatment composition of claim 19 wherein the surfactant has the following formula (Formula IV):

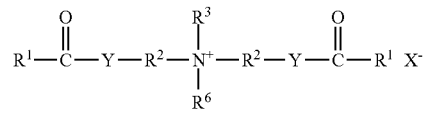

wherein:
each $R^1$ is independently a long chain, linear or branched, saturated or unsaturated, aliphatic group having 6 to 24 carbon atoms, or mixtures thereof;
each $R^2$ is independently a divalent alkylene group having 1 to 4 carbon atoms;
$R^3$ is an alkyl group having 1 to 4 carbon atoms;
$R^6$ is an alkyl group having 1 to 4 carbon atoms or —(R$^2$—O)$_n$—H;
each Y is independently O or NH;
n is 1-10; and
X$^-$ is an anion.

21. The fluorochemical treatment composition of claim 19 wherein the surfactant is present in an amount of greater than 3 wt-% based on fluorochemical solids.

22. The fluorochemical treatment composition of claim 21 wherein the surfactant is present in an amount of no greater than 20 wt-% based on fluorochemical solids.

23. The fluorochemical treatment composition of claim 19 wherein the surfactant of Formula III is the only surfactant present.

24. The fluorochemical treatment composition of claim 17 wherein the group that imparts durability comprises a polymerizable olefin group, an olefin group that undergoes a hydrosilation reaction, an epoxy group, a hydroxyl group, a halo group, a haloformyl group, an aziridino group, an acid group, an alkali metal salt of an acid group, an alkaline earth metal salt of an acid group, an amine salt of an acid group, a quaternary ammonium salt of an acid group, an amino group, a quaternary ammonium group, a salt of a quaternary ammonium group, a blocked isocyanate group, or blocked isocyanate groups from a combination of blocking agents.

25. A method of imparting repellency to a fibrous substrate having one or more surfaces, the method comprising:
applying a fluorochemical treatment composition of claim 17 onto one or more surfaces of the fibrous substrate; and
curing the fluorochemical treatment composition.

26. An article comprising:
a fibrous substrate having one or more surfaces treated according to the method of claim 25.

* * * * *

UNITED STATES PATENT AND TRADEMARK OFFICE
CERTIFICATE OF CORRECTION

PATENT NO. : 10,030,334 B2
APPLICATION NO. : 14/388165
DATED : July 24, 2018
INVENTOR(S) : Coppens et al.

It is certified that error appears in the above-identified patent and that said Letters Patent is hereby corrected as shown below:

In the Specification

Column 6
Line 35, Delete "trieethylenetetramine," and insert -- triethylenetetramine, --, therefor.

Column 7
Line 8, Delete "triisocyantes" and insert -- triisocyanates --, therefor.

Column 7
Line 10, Delete "(PAPI)," and insert -- (PAPI). --, therefor.

Column 7
Line 16, Delete "isophoronediisocynate," and insert -- isophoronediisocyanate, --, therefor.

Columns 17-18
Line 21 (approx.), Table 1, Delete "amonium" and insert -- ammonium --, therefor.

In the Claims

Column 25
Line 41, In Claim 19, delete "0" and insert -- O --, therefor.

Column 26
Line 16, In Claim 20, delete "0" and insert -- O --, therefor.

Signed and Sealed this
Twenty-third Day of April, 2019

Andrei Iancu
*Director of the United States Patent and Trademark Office*